Figure 1:
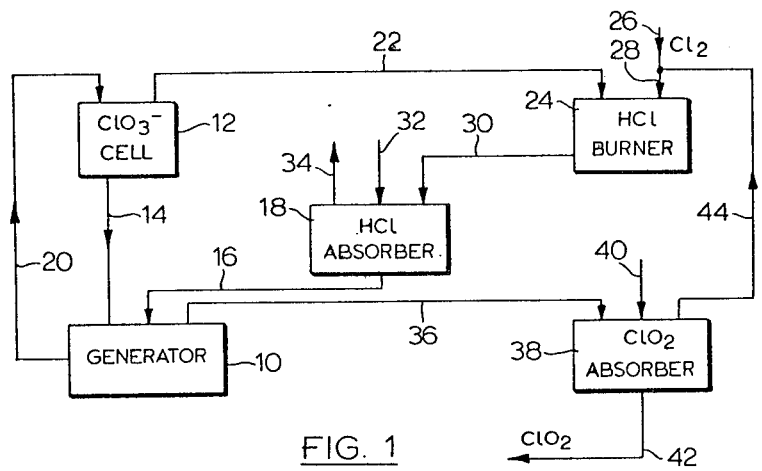

United States Patent [19]
Winfield

[11] 3,929,974
[45] Dec. 30, 1975

[54] PRODUCTION OF CHLORINE DIOXIDE

[75] Inventor: John D. Winfield, Etobicoke, Canada

[73] Assignee: ERCO Industries Limited, Islington

[22] Filed: Nov. 19, 1973

[21] Appl. No.: 416,879

Related U.S. Application Data

[60] Continuation of Ser. No. 166,733, July 28, 1971, abandoned, which is a division of Ser. No. 451,850, June 12, 1970, abandoned.

[52] U.S. Cl. ............... 423/478; 423/475; 423/481; 423/487; 423/499; 423/504; 423/648
[51] Int. Cl.² ........................................ C01B 11/02
[58] Field of Search .......... 423/478, 477, 475, 481, 423/487, 499, 504, 648

[56] References Cited
UNITED STATES PATENTS

| | | | |
|---|---|---|---|
| 2,654,656 | 10/1953 | Evans | 23/267 |
| 2,664,341 | 12/1953 | Kesting | 423/478 |
| 3,404,952 | 10/1968 | Westerlund | 423/478 |
| 3,442,778 | 5/1969 | Westerlund | 423/565 X |
| 3,446,584 | 5/1969 | Fuller | 423/552 X |
| 3,516,790 | 6/1970 | Westerlund | 423/478 |

FOREIGN PATENTS OR APPLICATIONS

| | | | |
|---|---|---|---|
| 668,062 | 1965 | Belgium | 423/478 |

*Primary Examiner*—Edward Stern
*Attorney, Agent, or Firm*—Sim & McBurney

[57] ABSTRACT

A continuous cyclic process for the production of chlorine dioxide includes the formation of a gaseous mixture of chlorine dioxide, chlorine and steam from an aqueous reaction medium containing an alkali metal chlorate and hydrochloric acid. Chlorine dioxide is recovered from the gaseous mixture. An alkali metal chloride is formed in the reaction and is removed from the reaction vessel either as an aqueous solution with unreacted chlorate and hydrochloric acid or as deposited solid. The alkali metal chloride is electrolyzed in aqueous solution to alkali metal chlorate which is recycled to the reaction vessel.

4 Claims, 2 Drawing Figures

PRODUCTION OF CHLORINE DIOXIDE

This application is a continuation of application Ser. No. 166,733 filed July 28, 1971 (now abandoned) which itself is a division of application Serial No. 45,850 filed June 12, 1970 (now abandoned).

The present invention relates to the production of chloride dioxide, and more particularly to methods of producing chloride dioxide from hydrochloric acid.

Chloride dioxide is known to be prepared in a variety of ways, involving the reduction of an alkali metal chlorate, generally sodium, utilizing sulphur dioxide, sulphuric acid, chromic sulphate, methanol, sodium chloride and hydrochloric acid as reducing agents, The basic reaction in all such processes is that between chlorate and chloride in the acid solution to produce chlorine dioxide, chlorine and water, in accordance with the equation:

$$HClO_3 + HCl \longrightarrow ClO_2 + \tfrac{1}{2}Cl_2 + H_2O$$

The present invention is concerned with the process of making chloride dioxide where the reducing agent is hydrochloric acid.

The basic reactions involved are, in the case where the alkali metal is sodium:

1. $NaClO_3 + 2HCl \longrightarrow ClO_2 + \tfrac{1}{2}Cl_2 + NaCl + H_2O$
and
2. $NaClO_3 + 6HCl \longrightarrow NaCl + 3Cl_2 + 3H_2O$ The two reactions are competing in the reaction solution and reaction (2) becomes significant in cases when there is an excess of hydrochloric acid above the stoichiometry of the equation (1). Where such an excess of hydrochloric acid exists, therefore, the quantity of chlorine dioxide produced per mole of sodium chlorate decomposed is reduced. In order to maximize chlorine dioxide production, it is preferred to operate at or near the stoichiometry of equation (1) in the feed to the reactor.

Chlorine dioxide is produced commercially from hydrochloric acid by the so-called Day-Kesting process disclosed in Canadian Patent No. 461,586 issued Dec. 6, 1947 to Brown Company. In this process the chlorine dioxide generator consists of a plurality of, generally six, reaction vessels arranged in series. Feed liquor containing sodium chlorate, hydrochloric acid and more sodium chloride is fed into the upper of the six reactors, from which the solution cascades by gravity through the remaining reactors. The two bottom reactors are operated at boiling temperature and the steam strips them of chlorine dioxide while the remaining hydrochloric acid is oxidized. Air is introduced into the gas stream from the last two reactors, mixes with the vapour and is bubbled countercurrently through the solution in the reactors three to six.

In accordance with the present invention, chlorine dioxide is produced from an aqueous reaction medium containing an alkali metal chlorate and hydrochloric acid contained in a reaction vessel. Water is evaporated from the reaction medium in the vessel and removes the chlorine dioxide and chlorine from the vessel.

Thus, in accordance with the present invention, the chlorine dioxide and chlorine is all produced in a single vessel and is removed from the vessel solely with the aid of steam evaporated from the aqueous reaction medium.

It has previously been proposed in Canadian Pat. No. 782,574 issued Apr. 9, 1968 to Chemech Engineering Limited, to produce chlorine dioxide and chlorine from sodium chlorine and hydrochloric acid in a single reaction vessel in place of the cascade six-vessel system used in the Day-Kesting process. In the process described in the above patent, gaseous hydrogen is passed through the reaction vessel to agitate the reaction liquor and as gaseous diluent for the chlorine dioxide and chlorine.

Chlorine dioxide gas in concentrated gaseous form is spontaneously explosive and in processes of producing chlorine dioxide it is necessary to make some provision for diluting the gases produced in the reaction. Air has commonly been used, as in the commercial Day-Kesting operation described above, and in the Canadian Pat. No. 782,574, hydrogen is the diluent gas. The gaseous stream from the reactor used in Canadian Pat. No. 782,574 contains water vapour in addition to the chlorine dioxide, chlorine and hydrogen.

In accordance with the present invention, steam is the sole diluent carrier gas for the gaseous reaction products. Such operation is advantageous over the hydrogen inert gas used in the above patent, since there is a danger of explosion of the gas mixture containing chlorine dioxide, chlorine and hydrogen, albeit reduced with regard to the danger of explosion where undiluted chlorine dioxide is involved, but by no means an insignificant danger. By contrast, operation in accordance with the present invention substantially eliminates the possibility of explosion.

In addition, operation in accordance with the present invention reduces the overall volume of gas to be handled, as compared to the hydrogen stripping operation described above. Further, less elaborate equipment is required in the operation of the present invention as compared with the operation descriped in Canadian Pat. No. 782,574.

It will be apparent therefore that the present invention gives rise to considerable advantages over prior art systems of producing chlorine dioxide from sodium chlorate and hydrochloric acid.

In practice, the process of the present invention is carried out at the boiling temperature of the reaction liquor. Operating in this manner ensures maximum vaporization of water from the reaction solution in the vessel, whereby chlorine dioxide and chlorine are rapidly educted from the vessel. The temperature of the reaction solution should be below the temperature above which substantial decomposition of chlorine dioxide occurs. It is preferred to operate the reaction vessel at temperature of approximately 60° to 80° C. In order to maintain the reaction solution in a boiling state in this temperature range, the reaction vessel is subjected to a reduced pressure. The magnitude of the reduced pressure is dependent upon the boiling temperature required.

Any convenient equipment may be utilized to subject the reaction vessel to a reduced pressure, for example, a water jet eductor may be used. The water fed to the eductor serves not only to produce the required reduced pressure, but also to condense the water vapour and to dissolve the chlorine dioxide and part of the chlorine produced.

A variety of reaction vessels may be utilized in the practice of the present invention. A suitable one is described in Canadian Pat. No. 825,084 issued Oct. 14, 1969 to Electric Reduction Company of Canada, Limited modified as required, depending on whether or not solids are deposited in the vessel. Such Canadian Patent describes the production of chlorine dioxide from an alkali metal chlorate, and alkali metal chloride and sulphuric acid in a single vessel generator-evaporator-crystallizer.

There are significant advantages to producing chlorine dioxide from an alkali metal chlorate with hydrochloric acid in a single vessel wherein the chlorine dioxide and chlorine produced are removed from the vessel by steam, in accordance with the present invention, as opposed to producing chlorine dioxide in accordance with the process of the copending application from an alkali metal chlorate, an alkali metal chloride and sulphuric acid, again removing the chlorine dioxide and chlorine with steam.

Thus, the by-product of the sulphuric acid process is an alkali metal sulphate. Generally, such alkali metal sulphate is added to the recovery system of a kraft mill operation to make up sulphur value losses. However, with increasing efficiency of Kraft mill recovery systems, especially in recovering sulphur values, sulphate make-up requirements are falling. In some installations, an excess of sodium sulphate over requirements may be generated.

Further, the hydrochloric acid operation of the present invention can operate at very low acidities, generally below 1N, whereas the sulphuric acid operation requires acidities of at least 2N and generally around 10N. Therefore, there is less danger of corrosion to equipment by operating in accordance with the present invention.

Further, the sulphuric acid operation requires three reactants, whereas the hydrochloric acid operation utilizes two.

It is apparent that the present invention represents a considerable advance in the art over conventional hydrochloric acid-based operations and over the sulphuric acid-based single vessel operation of the above-mentioned Canadian patent.

As mentioned above, it is preferred to operate the process of the present invention at molar concentration where the ratio of $Cl^-$ : $ClO_3^-$ is approximately 2:1. It is possible to use lower ratios, say 1:1, but all of the chlorate present is not reacted under these circumstances. It also is possible to use higher ratios of chloride to chlorate, say 5:1, but at these concentrations, equation (2) above becomes predominant, producing large quantities of chlorine in preference to chlorine dioxide.

The acidity of the reacting solution as indicated above is generally below 1N, preferably about 0.5N. In one particularly preferred embodiment described below the acidity may drop to 0.1–0.2N. The effective range of acidities in the process of the present invention is generally 0.05 to 1N.

The quantity of water evaporated from the reacting solution may be insufficient to produce precipitation of alkali metal chloride in the reaction vessel, but in accordance with a particularly preferred embodiment of the invention, the quantity of water evaporated in sufficient to precipitate alkali metal chloride in the reaction vessel.

The overall concept of the production of chlorine dioxide and chlorine from an alkali metal chlorate and hydrochloric acid in a single vessel, with steam being used to remove the chlorine dioxide and chlorine from the reaction vessel, forms the subject matter of application Serial No. 45,850 out of which this application is divided.

The present invention relates to a particular cyclic continuous operation which incorporates the broad concept of the parent application. The present invention assumes two forms, depending on whether or not alakli metal chloride is precipitated in the reaction vessel.

The process of the present invention will be described hereinafter with reference mainly to sodium salts, but it is understood that the present invention is applicable to other alkali metal salts, such as potassium salts.

In accordance with the present invention, chlorine dioxide and chlorine are produced continuously. In a preferred embodiment, the chlorine dioxide and chlorine are produced by continuously feeding an aqueous solution of sodium chlorate and continuously feeding a separate stream of hydrochloric acid to a reaction vessel subjected to reduced pressure and containing boiling reaction liquid, and continuously removing chlorine dioxide, chlorine and water vapour from the reaction vessel.

Where no sodium chloride is precipitated, reaction liquor containing sodium chloride, and unreacted sodium chlorate and hydrochloric acid is continuously removed from the vessel, to maintain the level of liquid within the vessel at a substantially constant level, and is continuously fed to a chlorate cell. The chlorate cell continuously subjects fed liquor to electrolysis to generate a liquid effluent rich in sodium chlorate and a gaseous effluent consisting substantially of hydrogen. The liquid effluent from the cell is continuously fed to the reaction vessel as the sodium chlorate feed stream. Hydrochloric acid in the spent reaction liquor is decomposed in the chlorate cell.

The embodiment of the invention wherein sodium chloride is precipitated now is described.

In accordance with this particularly preferred embodiment of the invention, sufficient water is evaporated from the reaction liquor within the vessel, that sodium chloride is precipitated in the vessel. This may be induced by feeding substantially concentrated solutions of sodium chlorate and hydrochloric acid to the reaction vessel. Upon reaction between the sodium chlorate and the hydrochloric acid and upon evaporation of water, sodium chloride precipitates out of the reaction liquor in the vessel. The vessel, therefore, may operate as a single vessel generator-evaporator-crystallizer.

It further has been found that it is possible to operate the process at extremely low acidities of the order of 0.1 to 0.2N and precipitate sodium chloride from the solution. The acidity of the reaction solution will attain a steady state when the process is operated continuously in accordance with the present invention. The acidity of the reaction medium will depend upon a number of factors such as initial concentration of feeds, temperature and quantity of water evaporated off.

Some spent reaction liquor may overflow from the reaction vessel and is recycled to the make-up feed streams. The precipitated crystalline sodium chloride is removed from the reaction vessel and washed with water to remove last traces of trapped reaction medium. The spent wash water may be fed along with the recycled reaction medium to the reaction vessel.

The sodium chloride thereby is recovered in a substantially pure state. The sodium chloride is thereby recovered, dissolved in water and the aqueous solution is fed to the chlorate cell preparing the sodium chlorate feed for the reaction vessel.

It is preferred to feed fresh sodium chloride solution to the chlorate cell rather than spent reaction liquor containing dissolved sodium chloride, as in the embodiment described above where sodium chloride is not precipitated.

The spent reaction liquor contains besides sodium chloride unreacted sodium chloride and hydrochloric acid and also dissolved chloride dioxide and chlorine not stripped in the reaction vessel. The presence of these materials gives rise to a series of side reactions, some potentially dangerous with large quantities of hydrogen mixing with the chloride dioxide and chlorine. The side reactions reduce the efficiency of the chlorate cell in its conversion of sodium chloride into sodium chlorate.

In contrast, where the feed is sodium chloride solution prepared from precipitated sodium chloride, the solution is substantially free from impurities, and therefore side reactions are substantially diminished. Therefore, operation of the process to precipitate sodium chloride in the reaction vessel is preferred to operations wherein the sodium chloride remains dissolved in the solution.

In a preferred embodiment, an aqueous solution of sodium chlorate and a separate stream of hydrochloric acid are continuously fed to a reaction vessel subjected to a reduced pressure and containing boiling reaction liquid. Chlorine dioxide, chlorine and water vapour are continuously removed from the reaction vessel and sodium chloride is continuously precipitated in the reaction vessel. Overflow spent reaction liquor may be continuously removed from the reaction vessel and make-up sodium chlorate solution continuously added thereto, and the overflow spent liquor together with make-up sodium chlorate solution are continuously fed to the reaction vessel as the sodium chlorate stream. Sodium chloride is continuously removed from the reaction vessel, continuously dissolved in water and continuously fed to a chlorate cell wherein it is converted into sodium chlorate and hydrogen. The sodium chlorate is continuously fed to the reaction vessel as make-up chlorate feed.

The hydrochloric acid feed for the reaction vessel operating in accordance with the present invention may be purchased as such, prepared from purchased hydrogen chloride gas, or preferably formed by combusting purchased chlorine with hydrogen off-gas from a chlorate cell and then dissolving the hydrogen chloride so formed in water. In some operations it may be desirable to feed hydrogen chloride gas directly into the reaction vessel. Some of the chlorine used to combust with the hydrogen may be supplied by chlorine generated in the reaction vessel.

The reaction occurring in the chlorate cell is:

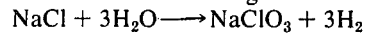

and the reaction involved in producing hydrogen chloride by combustion is:

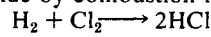

It will be seen from the above equation 1 that only two moles of hydrogen chloride (as hydrochloric acid in the reaction medium) is required for each mole of sodium chlorate. Therefore, only one-third of the mole quantity of hydrogen produced in the chlorate cell need be combusted with one mole of chlorine to produce the required mole amount of hydrogen chloride, and therefore ultimately the required mole amount of hydrochloric acid.

The excess hydrogen may be burned in air or oxygen to produce heat which enables the heat balance of the operation to be maintained, and water which may be used as part of the water requirement.

Wholly integrated systems therefore may be provided in accordance with the present invention in which the only feed stocks are chlorine and water and the only effluent is chlorine dioxide solution. Such integrated systems may be provided for both the case where sodium chloride is not precipitated and the case where sodium chloride is precipitated.

Figure 2:
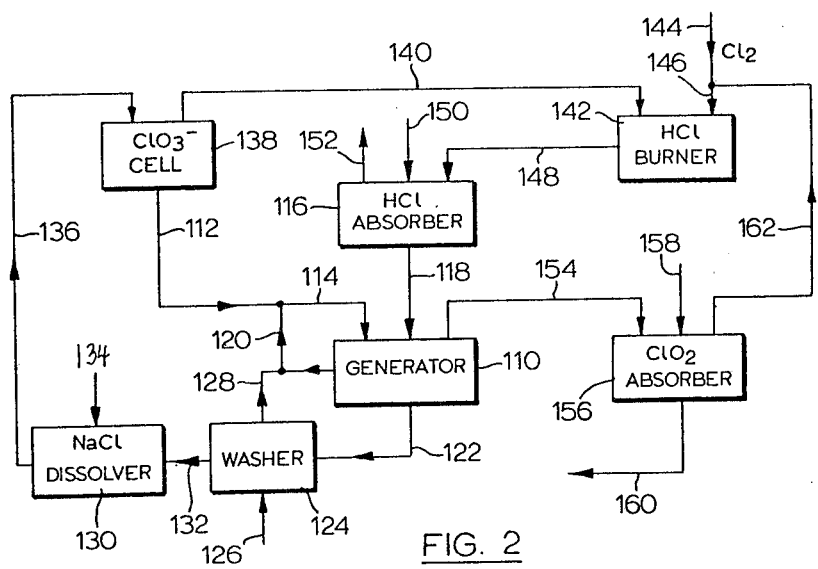

The present invention is further described by way of example with reference to the accompanying drawings, in which:

FIG. 1 represents a flow sheet for an integrated system in accordance with one embodiment of the present invention; and FIG. 2 represents a flow sheet for an integrated system in accordance with another embodiment of the present invention;

Referring to FIG. 1, a chlorine dioxide generator 10, such as one described in above-mentioned Canadian Pat. No. 825,084, containing a boiling aqueous reaction medium of sodium chlorate and hydrochloric acid is fed by sodium chlorate solution from a chlorate cell 12 through line 14. Hydrochloric acid is fed to the generator 10 through line 16 from hydrogen chloride absorber 18. The generator 10 is maintained under reduced pressure. Typical reaction conditions are 60°C at 150–200mm Hg.

The feeds are maintained at such a rate and the reactor liquor of sufficient concentration that product sodium chloride does not precipitate out. The level of reaction liquid is maintained substantially constant by adjusting the rates of the feed streams, the rate of removal of liquid as overflow, and the rate of removal of water by evaporation.

Overflow liquor from the reactor, containing sodium chloride, unreacted sodium chlorate and hydrochloric acid, and dissolved chlorine dioxide and chlorine is fed through line 20 to the cell 12. The liquor is electrolysed within the cell 12, converting the sodium chloride to sodium chlorate and converting the hydrochloric acid to hydrogen and chlorine. The effluent of the cell 12 is a liquid substantially enriched with sodium chlorate and containing some unconverted sodium chloride. This liquid is fed to the generator 10 through line 14.

The gaseous products of the cell 12, consisting mainly of hydrogen but containing a small amount of chlorine from the decomposition of the hydrochloric acid are fed by line 22 to a hydrogen chloride burner 24. Chlorine from a source of chlorine (not shown) is fed through lines 26 and 28 to the burner 24 and part of the hydrogen burns both with the chlorine fed to the burner 14 through line 28 and also with the chlorine in the off-gases from the cell 12 to produce hydrogen chloride. The burner 24 may be replaced by a fuel cell and the hydrogen and chlorine could be reacted therein, recovering electric power.

The hydrogen chloride gas, together with unreacted hydrogen, passes through line 30 to the absorber 18. Water is fed to the absorber 18 through line 32 to dissolve the incoming hydrogen chloride to produce hydrochloric acid. It may be desired in certain operations to feed the hydrogen chloride gas directly from the burner to the reaction vessel.

The excess unreacted hydrogen passes out of the absorber through line 34, generally for combustion with oxygen to produce water and heat. Alternatively, the hydrogen may be reacted with oxygen in a fuel cell thereby generating electric power.

The hydrochloric acid formed in the absorber 18 then is fed by line 16 to the generator 10. The gaseous products of the generator 10, i.e., chlorine dioxide, chlorine and steam, are fed by line 36 to a chlorine dioxide absorber 38. Water is fed by line 40 to the absorber 38 to absorb chorine dioxide from the gaseous products and to condense the stream. The water fed by line 40 may be the feed of a water eductor used to maintain the generator 10 under reduced pressure.

The vacuum may be produced in any convenient manner such as a liquid venturi fed with recycled chlorine water formed by condensing the remaining water vapour and dissolving part of the chlorine by this water. Alternatively, the vacuum may be provided by a pump attached to the gas outlet of the absorber 38. The pump discharges a mixture of gaseous chlorine and aqueous chlorine which can be held in a tank, and the chlorine solution recycled to the pump. It may be necessary from time to time to remove some of the chlorine water. Such chlorine water can be readily utilized in the bleaching plant.

An aqueous solution of chlorine dioxide, containing some dissolved chlorine, is recovered through line 42 and is suitable as feed for a chlorine dioxide bleaching installation.

Undissolved chlorine passes out of the absorber through line 44 to augment the chlorine gas feed through line 28 to the burner 24.

It will be understood that, for the sake of simplicity, pumps and hold tanks have been omitted.

Turning now to consideration of the embodiment of FIG. 2, a generator 110, such as the one disclosed in the abovementioned Canadian Pat. No. 825,084, containing a boiling aqueous reaction medium of sodium chlorate and hydrochloric acid and maintained under a reduced pressure is fed with sodium chlorate solution by lines 112 and 114. Hydrochloric acid from a hydrogen chloride absorber 116 is fed through line 118. The generator 110 evaporates sufficient water from the reaction medium that sodium chloride is precipitated out in the generator. It is preferred that the evaporation be sufficient to maintain the level of reaction liquor in the vessel 10 at a substantially constant level. Any overflow liquor from the reactor containing unreacted sodium chlorate and hydrochloric acid is recycled through line 120 to the sodium chlorate feed stream 114.

The rate of feed of reactants, the rate of removal of liquid as overflow, and rate of evaporation of water, are maintained at such a value that the level of reaction medium within the generator remains substantially constant.

Sodium chloride deposited in the generator 110 is removed through line 122 to a separator/washer 124. The sodium chloride crystals are separated from reaction liquor and are washed. The spent wash water and separated reaction liquor may be passed to waste or, as illustrated in FIG. 2, fed to the generator 110 by lines 128, 120 and 114.

The washed substantially pure crystals of sodium chloride next are passed to a dissolver 130 by line 132. Water fed through line 134 dissolves the sodium chloride in the dissolver 130 to form an aqueous solution of sodium chloride. The aqueous solution of sodium chloride so formed is fed by line 136 to a chlorate cell 138. The sodium chloride is electrolysed in the chlorate cell

138 to form a sodium chlorate solution and hydrogen. The sodium chlorate solution is fed through lines 112 and 114 to the generator 110.

The off-gas from the chlorate cell 138, consisting essentially of hydrogen, is fed by line 140 to a hydrogen chloride burner 142. Chlorine is fed from a source of chlorine (not shown) through lines 144 and 146 to the burner. Chlorine fed through line 146 to the burner 142 is burned in part of the hydrogen and the hydrogen chloride produced, together with unreacted hydrogen, is fed through line 148 to hydrogen chloride absorber 116.

Alternatively, the burner may be replaced by a fuel cell to which the hydrogen and chlorine are fed, hydrogen chloride is produced and electric power is also produced.

Water is fed through line 150 to the absorber 116 to dissolve the hydrogen chloride to provide hydrochloric acid of the desired concentration. Excess hydrogen passes through line 152.

It may be desirable under some circumstances to feed hydrogen chloride gas directly to the generator.

The excess hydrogen may be burned with oxygen to produce heat, to balance the energy values, and water, which may be used as part of the requirement of the system. Alternatively, the hydrogen and oxygen may be fed to a fuel cell and electrical energy recovered thereby.

The hydrochloric acid produced in the absorber 116 is passed through line 118 to the generator 110. The gaseous products of the generator 110 consisting essentially of chlorine dioxide, chlorine and steam, are passed by line 154 to a chlorine dioxide absorber 156.

Water is fed to the absorber 156 through line 158 to condense at least part of the water vapour and to dissolve the chlorine dioxide. The liquid effluent of the absorber 156 leaving through line 160 is an aqueous solution of chlorine dioxide, containing some dissolved chlorine and is suitable for use as feed for a chlorine dioxide bleaching operation.

The water fed through line 158 may be used as feed for a water eductor which maintains the generator 110 at the desired reduced pressure.

Chlorine gas from the absorber 156 is fed by line 162 to the chlorine feed stream 146 to the hydrogen chloride burner 142.

The means imparting the reduced pressure to the generator 110 may be located in the chlorine line 162 near the exit of the absorber 156. Such means may take the form of a pump or a liquid fed venturi. In such a system, a certain amount of water vapour is drawn into the pump or venturi, together with the chlorine. Upon condensation, chlorine water is provided as well as chlorine gas. The gas is fed along line 162 and the water is recycled to the pump or venturi to contact incoming chlorine and water vapour. If the chlorine water accumulates excessively, it may be necessary from time to time to remove part of the chlorine water. Such removed chlorine water may be used in a bleach plant.

It will be understood that for the sake of simplicity pumps and hold tanks have been omitted.

The present invention therefore provides continuous integrated systems of producing chlorine dioxide solution as the only effluent with the only feed streams required being chlorine and water.

The heat generated by the chlorate cells may be utilized as part of the heat requirement of the generators by use of heat exchangers. Heat also may be imparted to the generator by combusting the excess hydrogen with oxygen.

A number of modifications clearly are possible to the above-described integrated systems as will be obvious to anyone skilled in the art.

The present invention is illustrated further by the following Examples.

EXAMPLE 1

A single vessel generator-evaporator contained a reacting solution of sodium chlorate, sodium chloride and hydrochloric acid. The solution was maintained at about 50°C and the vessel under 26 inches Hg vacuum. Effluent liquor from the vessel contained 300g/l sodium chlorate, 177g/l sodium chloride and 0.2N HCl.

The liquor fed to the vessel was a 20ml/min feed of a solution containing 250g/l sodium chlorate and 150g/l sodium chloride and a 2ml/min feed of 30% hydrochloric acid to maintain the acidity.

Chlorine dioxide and chlorine were produced in the vessel and removed by steam. The vapours were passed to an absorption system where the steam was condensed and the chlorine dioxide and chlorine separated by known methods. Chlorine dioxide was recovered from the vessel at a rate of 0.52g/min (about 38 G.A.% chlorine as chlorine dioxide) and stream was removed from the vessel at a rate of 2.5 ml/min.

The effluent liquor from the vessel was passed to an electrolytic chlorate cell operating at 35°C and 0.5 amps/sq.in. current density. The hydrochloric acid in the cell feed served to maintain the cell liquor pH at 5.1 to 5.3. The cell, operating at about 85% current efficiency, generated a liquor containing 350g/l sodium chlorate and 150g/l sodium chloride. This latter liquor constituted the feed for the vessel. Hydrogen together with about 3 to 4% chlorine was generated by the cell.

EXAMPLE 2

The procedure of Example 1 was repeated under varying single vessel generator-evaporator conditions. In each case a mixture of chlorine dioxide and chlorine was recovered. The following Table I reproduces the results:

Table I

| Vessel Temp. °C | Cl/ClO$_3$ mol ratio in feed | Acidity of reacting liquor | GA% Cl$_2$ as ClO$_2$ | H$_2$O/ClO$_2$ Wt. ratio in vapors |
| --- | --- | --- | --- | --- |
| 55 | 0.68 | 0.17 | 39–40 | 8.9 |

Table I-continued

| Vessel Temp. °C | Cl/ClO$_3$ mol ratio in feed | Acidity of reacting liquor | GA% Cl$_2$ as ClO$_2$ | H$_2$O/ClO$_2$ Wt. ratio in vapors |
| --- | --- | --- | --- | --- |
| 55 | 0.70 | 0.20 | 38–39 | 5.2 |
| 60 | 0.50 | 0.12 | 40–41 | 7.8 |
| 70 | 0.47 | 0.07 | 39–40 | 7.4 |

Modifications are possible within the scope of the invention.

What I claim is:

1. A process for the production of chlorine dioxide which comprises continuously feeding an aqueous solution of an alkali metal chlorate and hydrochloric acid to a reaction zone to maintain an aqueous reaction medium in said reaction zone containing an alkali metal chlorate and hydrochloric acid and having an acidity of about 0.05 to about 1N, continuously forming chlorine dioxide and chlorine by reaction between said alkali metal chlorate and said hydrochloric acid in said reaction medium, continuously maintaining said reaction zone under a reduced pressure, continuously maintaining said reaction medium at its boiling point to evaporate water from said reaction medium to form continuously a gaseous phase in said reaction zone consisting of a mixture of chlorine dioxide, chlorine and water vapor, and to deposit alkali metal chloride in said reaction zone, continuously conducting said gaseous phase mixture out of said reaction zone, continuously recovering chlorine dioxide from said mixture, removing deposited alkali metal chloride from said reaction zone, forming an aqueous solution from said removed alkali metal chloride, continuously electrolyzing said latter aqueous solution to convert the alkali metal chloride at least partially to alkali metal chlorate and to generate hydrogen gas, continuously feeding at least the alkali metal chlorate content of the alkali metal chlorate-containing solution to said reaction zone, continuously reacting at least part of said hydrogen gas with chlorine gas to generate hydrogen chloride, continuously forming hydrochloric acid from said hydrogen chloride and continuously feeding at least part of said hydrochloric acid to said reaction zone.

2. the process of claim 1 wherein said alkali metal chlorate is sodium chlorate.

3. The process of claim 1 including recovering chlorine from said gaseous mixture and utilizing said recovered chlorine as part of said chlorine reacting with hydrogen to generate hydrogen chloride.

4. The process of claim 1 wherein said acidity is from about 0.1 to about 0.2 normal.

* * * * *